Sept. 27, 1966 R. B. BLIZARD 3,275,095
ACOUSTIC WELL LOGGING APPARATUS
Filed Sept. 21, 1959 10 Sheets-Sheet 1

INVENTOR.
ROBERT B. BLIZARD
BY
his ATTORNEYS

FIG. 2

INVENTOR.
ROBERT B. BLIZARD

CARTRIDGE SCHEDULE FOR LOGGING

FIG. 4.

Sept. 27, 1966  R. B. BLIZARD  3,275,095
ACOUSTIC WELL LOGGING APPARATUS
Filed Sept. 21, 1959  10 Sheets-Sheet 6

CARTRIDGE SCHEDULE FOR CALIBRATION

FIG. 6

INVENTOR.
ROBERT B. BLIZARD
BY
his ATTORNEYS

Sept. 27, 1966  R. B. BLIZARD  3,275,095
ACOUSTIC WELL LOGGING APPARATUS
Filed Sept. 21, 1959  10 Sheets-Sheet 7

INVENTOR.
ROBERT B. BLIZARD

BY
Brumbaugh, Free, Graves & Donohue his ATTORNEYS

Sept. 27, 1966 R. B. BLIZARD 3,275,095
ACOUSTIC WELL LOGGING APPARATUS
Filed Sept. 21, 1959 10 Sheets-Sheet 8

INVENTOR.
ROBERT B. BLIZARD
BY
Brumbaugh, Free, Graves & Donohue
his ATTORNEYS

Sept. 27, 1966     R. B. BLIZARD     3,275,095
ACOUSTIC WELL LOGGING APPARATUS Filed Sept. 21, 1959     10 Sheets-Sheet 10

INVENTOR.
ROBERT B. BLIZARD
BY Brumbaugh, Free, Graves & Donohue
his ATTORNEYS

United States Patent Office 3,275,095
Patented Sept. 27, 1966

3,275,095
ACOUSTIC WELL LOGGING APPARATUS
Robert B. Blizard, Houston, Tex., assignor to Schlumberger Well Surveying Corporation, Houston, Tex., a corporation of Texas
Filed Sept. 21, 1959, Ser. No. 841,401
8 Claims. (Cl. 181—.5)

This invention relates to apparatus for investigating the subterranean formations traversed by a bore and, more particularly, to new and improved apparatus for logging earth formations by determining the velocity of propagation of acoustic waves therethrough.

It is well known that earth formations in the vicinity of a bore can often be identified from a knowledge of the velocity of propagation of acoustic or sound energy waves in them. Heretofore, indications of the so-called "short interval" acoustic wave velocity in the earth formations have usually been obtained by apparatus including at least one transmitter and two longitudinally spaced apart receivers together with means to determine the difference between the time of arrival at the two receivers of a wave from the transmitter. Another apparatus for the same purpose includes a transmitter and only one receiver together with means to determine the time required for a wave to travel from the transmitter to the receiver. The systems heretofore employed for measuring the short interval velocity have generally included means for obtaining measurements at equal time intervals while the apparatus is passing through the bore and for conveying these measurements to the surface of the ground in the form of a voltage whose amplitude is representative of the measurement. Conventional integrating equipment has also been used to integrate a plurality of these voltages to provide an approximation to the total time required for an acoustic wave to travel from the surface of the ground or any other fixed reference point to the level of the detecting apparatus in the bore. It has been found that these measurements may be obtained much more reliably and accurately using apparatus constructed in accordance with the invention which obtains a velocity measurement at equal depth intervals in the bore and conveys these measurements to the surface of the ground in the form of two spaced apart pulses.

Accordingly, it is an object of the invention to provide new and improved acoustic well logging apparatus which enables indications to be obtained of the short interval acoustic wave velocity and of the total travel time of acoustic waves with substantially increased accuracy than has been hitherto obtainable.

Another object of the invention is to provide new and improved acoustic well logging apparatus which measures the acoustic wave travel time at equal depth intervals in the bore and which conveys these measurements to the surface of the ground in the form of two spaced apart sharp pulses.

Still another object of the invention is to provide new and improved acoustic well logging apparatus wherein indications are obtained of the short interval acoustic wave velocity and of the total travel time of acoustic waves separately and recorded on the same recorder.

These and other objects of the invention are attained by providing a well logging apparatus adapted to be disposed in a bore that includes means for emitting energy into the adjacent media, energy detecting means responsive to the emitted energy for deriving signals representative of a parameter of the media, and means coupled to at least one of the energy emitting means and the energy detecting means for controlling the operation thereof at predetermined regular intervals along the bore.

The energy being emitted may include acoustic wave energy, electrical energy, nuclear energy, etc. The adjacent media may be earth formations or pipe forming the bore. In a preferred embodiment of the invention, acoustic well logging apparatus is provided in which an electrical pulse is generated by each of two spaced apart receivers in the bore in response to the arrival thereat of each acoustic wave emitted by a nearby transmitter, which pulses are transmitted to the earth's surface. At the surface, the pulses operate a gating device which allows pulses from a pulse generator to pass to a counter for a time interval equal to the spacing between the pulses, successive pulses denoting the arrival of an acoustic wave at the two receivers. The counts taken at a series of adjacent depth intervals are accumulated to produce a value representative of the total time required for an acoustic wave to travel from the initial position of the apparatus in the bore to its position at any instant thereafter. The output pulses from the receivers also operate a time to amplitude converter at the surface which gives indications of the short interval acoustic wave velocity in the formation of each position of the apparatus in the bore.

In another embodiment of the invention, a transmitter and a single receiver are employed. The two pulses received at the surface are in this case generated when an acoustic wave leaves the transmitter and when it arrives at the receiver.

In still another embodiment of the invention, an acoustic wave is generated at equal time intervals and the counter at the surface selects a predetermined number of the pulses received from the apparatus in the bore, per unit length of travel of the apparatus through the bore.

These and other embodiments of the invention may be better understood from the following detailed description taken in conjunction with the accompanying figures of the drawings in which.

Figures 1, 7, 8:
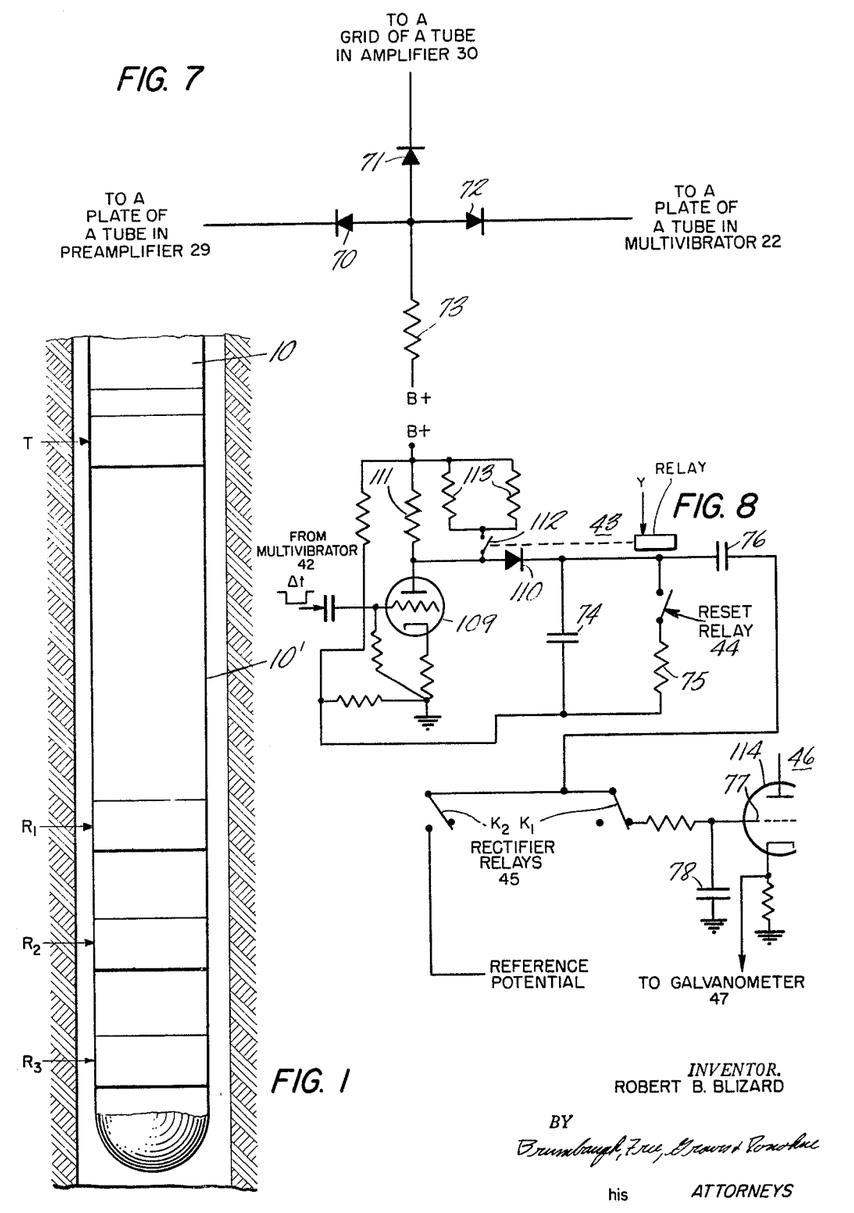
FIGURE 1 is a schematic diagram of a section through the earth showing a portion of an acoustic well logging apparatus disposed in a bore drilled into the earth, the casing of the apparatus being partially broken away.
FIGURE 7 is a circuit diagram of a portion of the channel switch shown in block form in FIGURE 2.
FIGURE 8 is a circuit diagram of the short interval velocity measuring circuit shown in block form in FIGURE 3.

In FIGURE 1 is shown an acoustic well logging apparatus which is adapted to be lowered into a bore by a conventional winch and cable (not shown). The apparatus or support includes an electronic cartridge 10 for certain downhole electronic equipment to be described hereinafter, and an assembly 10' that carries an acoustic energy transmitter T and a plurality of longitudinally spaced apart acoustic receivers $R_1$, $R_2$ and $R_3$. Electrical conductors running through the supporting cable and insulated therefrom connect the downhole electronic equipment, shown in detail in FIGURE 2, to the electronic equipment shown in detail in FIGURE 3 which may be mounted in a panel at the earth's surface, for example.

Figure 3:
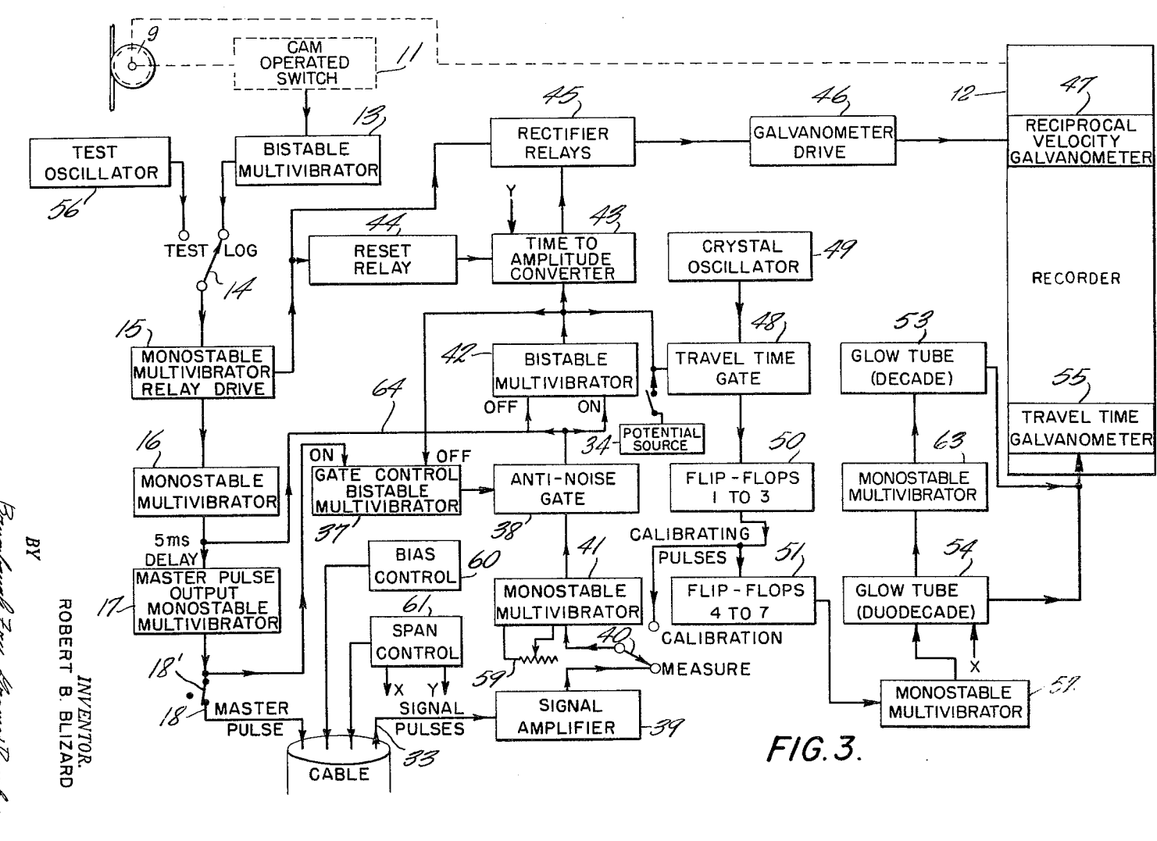
FIGURE 3 is a block diagram illustrating schematically the panel portion of acoustic well logging apparatus constructed in accordance with one embodiment of the invention.

Referring first to the panel equipment shown in FIGURE 3, a fixed number of master pulses per foot of travel of the apparatus in the bore is obtained by mechanically coupling a cam operated switch 11 to a cable wheel 9 that frictionally engages the cable that carries the logging apparatus. A recorder 12 is coupled to the cable wheel 9 in a conventional manner so that it rotates at a rate which is proportional to the rate of travel of the apparatus in the bore. Instead of a cam operated switch a selsyn motor or other conventional means could be coupled to the recorder and periodically produce a master pulse. The electrical output from the switch 11 is coupled directly to a bistable multivibrator 13 which is triggered each time a pulse is received from the switch 11. A switch 14, when in the "Log" position, connects the output of the multivibrator 13 to the input of a monostable multivibrator 15, which, in turn, triggers a monostable multivibrator 16. The multivibrator 15 also operates a reset relay 44 and a pair of rectifier relays 45 which are used in conjunction with a time to amplitude converter 43, as will be explained in greater detail hereinafter with reference to FIGURES 8 and 11. The multivibrator 16 has a built-in 5 millisecond time delay which permits these relays to operate before its output triggers a master pulse output monostable multivibrator 17 and sends a pulse to the electronic equipment in the cartridge 10 when a switch 18' is closed. The multivibrators 16 an 17 also trigger a pair of multivibrators 42 and 37, respectively, for purposes to be explained later.

Figure 4:
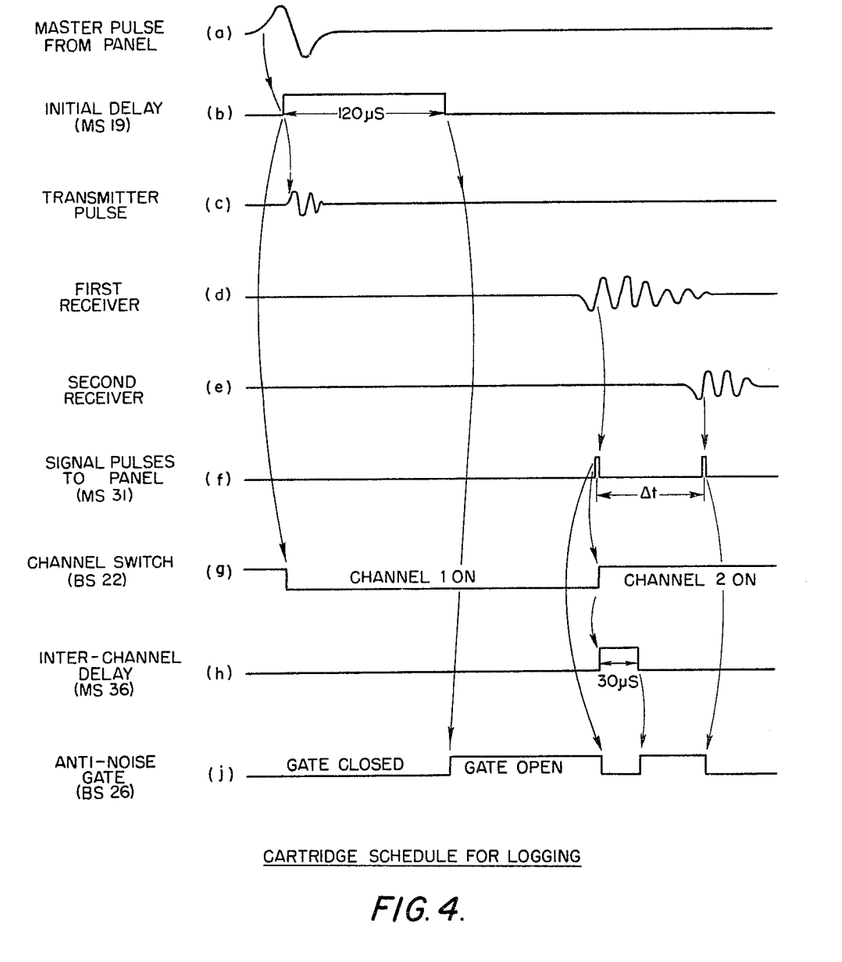
FIGURES 4 and 5 are graphs illustrating the sequences of events in the operation of the bore and surface equipments, respectively.

The pulse output from the multivibrator 17 is connected by a conductor 18 to the input to a monostable multivibrator 19 mounted in the cartridge 10 (FIGURE 2) when the switch 18' is closed. The output from the multivibrator 19 is sent without delay to a pulser 20 which includes a cathode follower circuit and a hydrogen thyratron tube which drives the acoustic transmitter T. The multivibrator 19 is also connected by conductors 23 and 24 to a bistable multivibrator 22 and the pulse output puts this multivibrator in a number one position which acts to put a channel switch 25 in position to pass signals from the first receiver $R_1$. After a 120 microsecond delay, the downcoming portion of the pulse from the multivibrator 19 turns a bistable multivibrator 26 to the "on" condition which opens an anti-noise gate 27 to pass signals from the receivers. The time delay is provided so that the gate 27 will remain closed until just prior to the earliest possible time of arrival of the acoustic wave at the first receiver so that the likelihood of a noise signal accidentally triggering the apparatus is decreased. This sequence of events is illustrated graphically by the waveforms shown in FIGURE 4.

Figure 2:
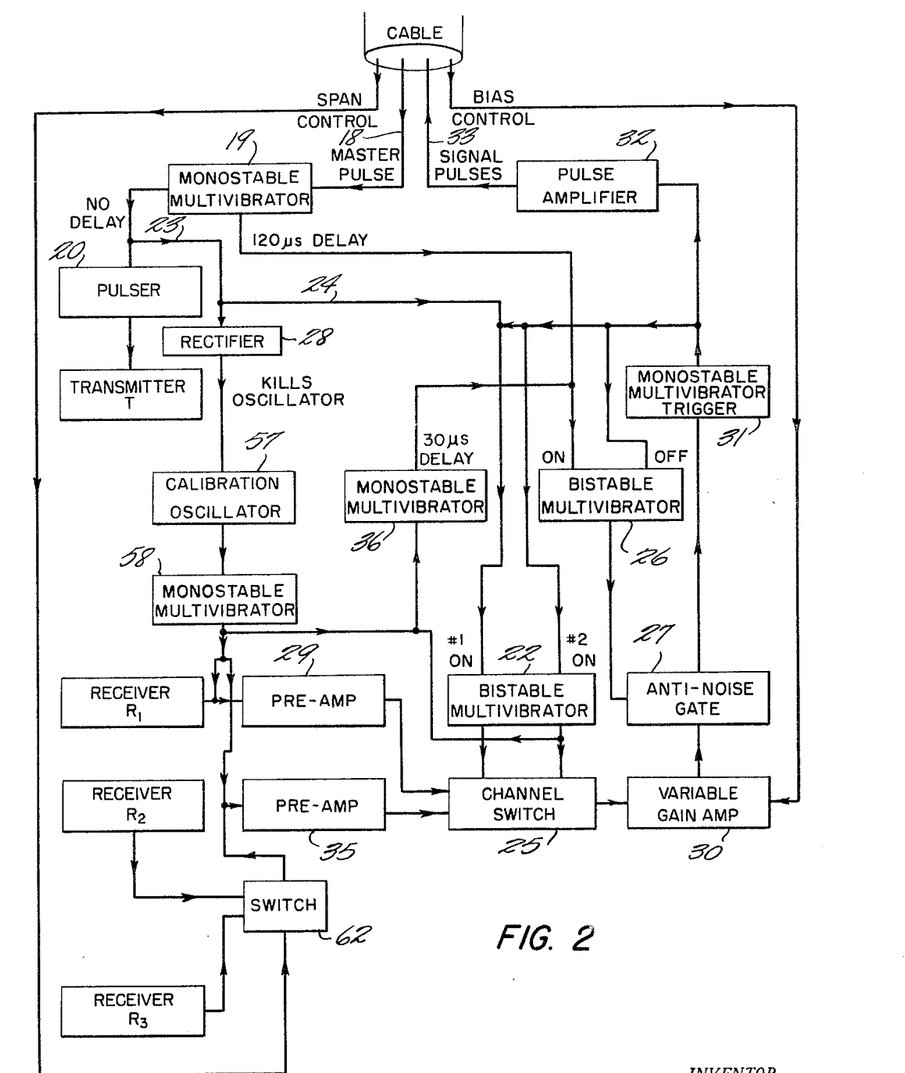
FIGURE 2 is a block diagram of the electronic equipment contained in the cartridge portion of the well logging apparatus shown in FIGURE 1.

The transmitter T generates acoustic waves which are detected by the series of receivers $R_1$, $R_2$ and $R_3$. The waves reach the receiver $R_1$ first and generate an electrical signal which is amplified by a preamplifier 29 and, since the channel switch 25 has been placed in position to pass signals from the receiver $R_1$ by the pulse received from the multivibrator 19, the signal is passed to a variable gain amplifier 30. By this time, more than 120 microseconds have elapsed so that the multivibrator 26 has been turned "on" and the anti-noise gate 27 is open and the signal is passed to and actuates a monostable multivibrator trigger 31.

The output pulse from the multivibrator 31 places the multivibrator 26 in an "off" condition, which action closes the anti-noise gate 27. The output pulse from the multivibrator 31 also triggers the bistable multivibrator 22 to put the channel switch 25 in position to pass signals received from a second preamplifier 35. When the multivibrator 22 goes to the number two position, it also triggers a monostable multivibrator 36 which, after a delay of 30 microseconds, puts the multivibrator 26 in the "on" condition and opens the gate 27 just prior to the earliest possible arrival of the signal generated when the acoustic wave reaches the second receiver $R_2$. The reason for closing the anti-noise gate 27 during the time between the two signals is to block the switching transient resulting when the switch 25 changes channels. It should be noted that the multivibrator 36 is triggered only when the multivibrator 22 goes to the number two position and, therefore, will operate only between the first and second signals. The sequence of operations described above is illustrated schematically in the graph shown in FIGURE 4.

It can be seen, therefore, that each time a master pulse is sent down the cable from the panel an acoustic wave is generated in the formations and is detected by the receivers. A span control switch 61 (FIGURE 3) in the panel controls a switch 62 in the cartridge and determines whether an electrical signal from the second receiver $R_2$ or the third receiver $R_3$ will be utilized. The signals from the receivers trigger the monostable multivibrator 31, whose output pulses are amplified by an amplifier 32 and are sent up the cable over a conductor 33.

At the surface of the ground, the pulses from the amplifier 32 are again amplified by an amplifier 39, FIGURE 3, pass through a switch 40 and trigger a multivibrator 41. When the master pulse was sent down the conductor 18, the pulse from the multivibrator 17 also turned on a gate control bistable multivibrator 37 which, when turned on, opens an anti-noise gate 38. The output pulses from the monostable multivibrator 41, therefore, pass through the open gate 38 and operate a bistable multivibrator 42. The multivibrator 41 also contains a differentiator in its output circuit so that, for each master pulse sent to the transmitter T, its output consists of two significant sharp pulses of a given polarity separated by a time interval $\Delta t$ equal to the time interval between the arrival of the acoustic wave at the two receivers. The multivibrator 42 operates both a short interval velocity measuring circuit and a total travel time measuring circuit.

The short interval velocity measuring circuit is illustrated in FIGURE 3 and in detail in FIGURE 8. The bistable multivibrator circuit 42 produces a negative going pulse having a time duration equal to the time interval $\Delta t$. This negative going pulse is received by a time to amplitude converter 43 which includes a tube 109, FIGURE 8, that is normally conducting. The negative going pulse cuts off the tube 109 with the result that the voltage on the plate rises until a diode 110 conducts. A capacitor 74 is thereby charged to a voltage that depends upon the duration of the $\Delta t$ pulse and the value of the resistance in series with the capacitor 74. If receivers $R_1$ and $R_3$ are being employed a switch 112 is opened so that only the resistor 111 is connected in series with the capacitor 74.

On the other hand, if receivers $R_1$ and $R_2$ are being employed, the switch 112 is closed which connects a pair of resistors 113 into the circuit in parallel with the resistor 111, so that the capacitor 74 is still charged to nearly the same value even though the time duration is relatively short. The switch 112 is synchronized with the switch in the span control circuit 61 by a connection Y, FIGURE 3.

During the time that the pulse is being received from the multivibrator 42, the reset relay 44 is in an open position and the rectifier relays 45, which include the relays $K_1$ and $K_2$, are in an open position. These three relays are driven by the relay drive 15 in a time sequence that will be discussed in relation to FIGURE 11. In general, the rectifier relay $K_2$ connects the capacitor 76 to a reference potential just prior to the arrival of the pulse from the multivibrator 42, and the rectifier relay $K_1$ closes the capacitor 76 on the grid 77 of a tube 114 in the galvanometer drive circuit 46. This tube is connected in a cathode follower type circuit with the output being taken off of the cathode to drive a galvanometer 47 that forms part of the recorder 12. A capacitor 78, which has a much smaller capacity than the series combination of capacitors 74 and 76, is connected to the grid 77 and is charged nearly to the potential on the capacitor 76 and holds the grid 77 at this level after the relay $K_1$ opens. The reset relay 44 then closes and discharges the capacitor 74 before the beginning of the next cycle. The purpose of resistor 75 is to limit the peak current thus protecting the relay contacts.

It can be seen that the galvanometer 47 is deflected by successive time interval pulses by an amount that is indicative of the time difference between the pulses. The output of the cathode follower circuit in the galvanometer drive 46 is a staircase type of wave form because the grid 77 is held at each level by the capacitor 78 until it is changed by a new measurement.

Figure 11:
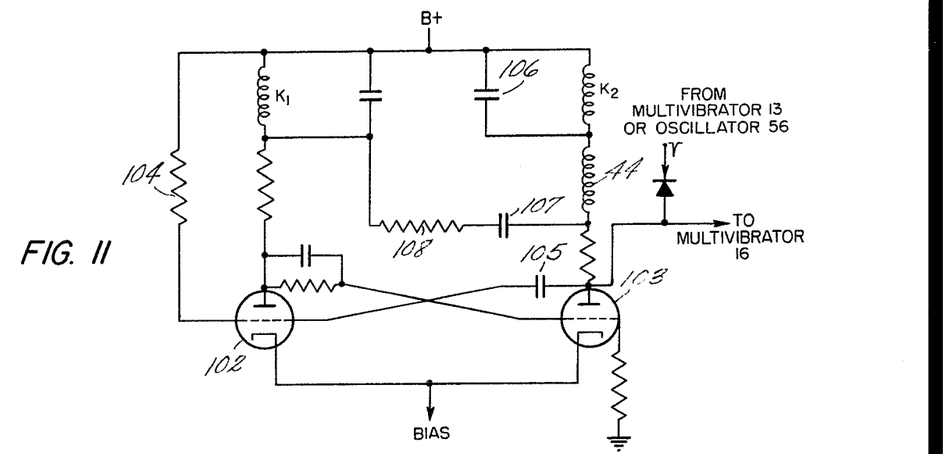
FIGURE 11 is a circuit diagram of the multivibrator relay drive shown in block form in FIGURE 3.

The multivibrator relay drive 15 for the rectifier relays 45 and the reset relay 44 is illustrated in detail in FIGURE 11. It includes the coils of the three relays, which are normally closed when the coils are in an unenergized condition. The coils have a pull-in level of current which must be reached to close the relays and they have a drop-out level of current which must be reached to open the relays. Normally, a tube 102 is conducting and a tube 103 is nonconducting so that the coil of the relay $K_1$ is energized and the coils of the relays $K_2$ and 44 are not energized. The negative going output from the multivibrator 13 is converted into a sharp negative pulse by a capacitor in the output line of the multivibrator 13. This pulse places the relay drive circuit in the timing state where the tube 103 is conducting and the tube 102 is non-conducting. When the current in the coils of the relays $K_2$ and 44 reaches the pull-in level, the relays $K_2$ and 44 open. The relay $K_1$ remains open until the drop-out level of current in the coil is reached whereupon relay $K_1$ closes. For a short time, however, all of the relays are open and it is during this time that the pulse representing the time interval is received from the multivibrator 42. After about 40 milliseconds the relay drive returns to its normal state, the duration of the timing state being determined by the value of a resistor 104 and a capacitor 105. The current in the coil of the relay 44 decreases at a faster rate than the current in the coil of the relay $K_2$ because of a capacitor 106 connected in parallel with the coil of the relay $K_2$ so that the relay 44 closes before the relay $K_2$. A capacitor 107 and a resistor 108 insure that the relay 44 does not close before the relay $K_1$ opens.

Figure 5:
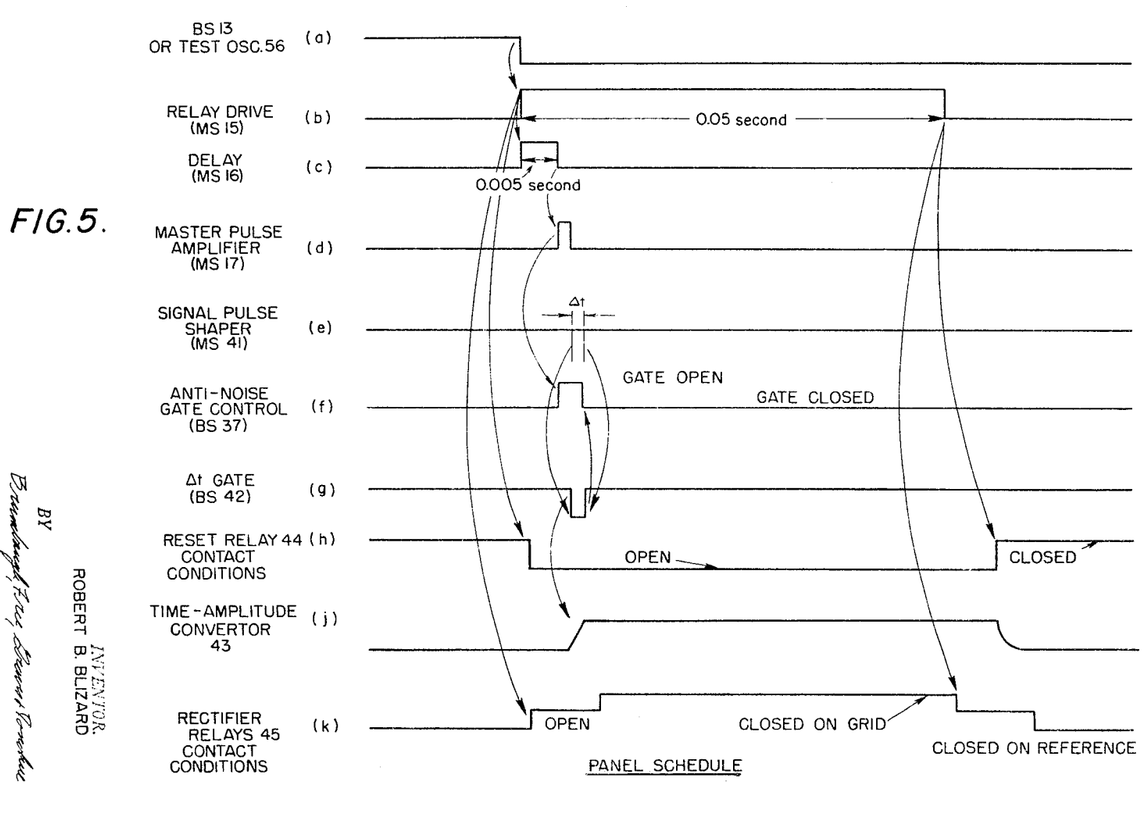

The previously explained operations are illustrated by the graph shown in FIGURE 5. All of the waveforms are representative of voltages except the waveforms $(h)$ and $(k)$ which represent contact conditions of the reset relay 44 and the rectifier relays $K_1$ and $K_2$. From waveform $(h)$ it can be seen that the reset relay 44 opens before the master pulse is transmitted and is closed automatically by the voltage output from the relay drive 15, waveform $(b)$. From the waveform $(k)$ it can be seen that the capacitor 76 is normally closed on the reference potential; while the time interval pulse is being received both of the relays $K_1$ and $K_2$ are open and following the charging of the capacitor 74, the relay $K_1$ closes the capacitor 76 on the grid 77 of the tube 114 in the galvanometer drive 46. The relays then return to their normal positions in preparation for the next cycle.

In order to measure the total travel time of an acoustic wave over an extended distance in the bore, the multivibrator 42 further operates a travel time gate 48 in such a manner that pulses from a crystal oscillator 49 pass through it during the pulse time interval to a counting circuit which consists of seven flip-flop stages 50 and 51, a monostable multivibrator 52, a duodecade blow tube 54, a monostable multivibrator 63, and a decade glow tube 53. The two glow tubes 53 and 54 drive a galvanometer 55 in the recorder 12 which indicates the total travel time of an acoustic wave from a reference point to the position of the apparatus in the bore. The signals produced by the galvanometers 47 and 55 are preferably recorded on the same strip of photographic film in a conventional manner.

Figure 9:
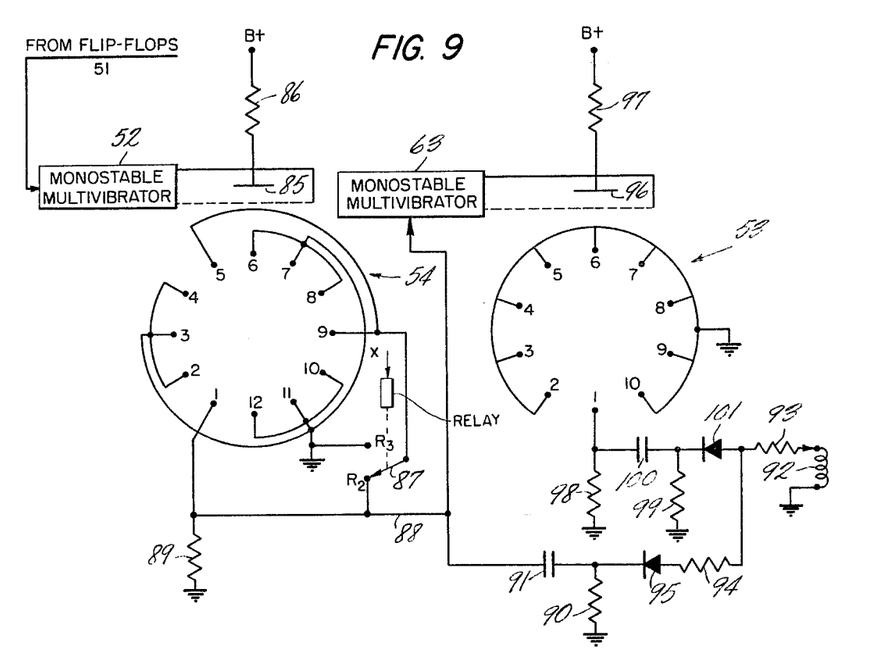
FIGURE 9 is a circuit diagram of a portion of the total travel time counting circuit shown in block form in FIGURE 3.

With reference to FIGURE 9 wherein a portion of the total travel time counting circuit is illustrated in greater detail, pulses from the last of the flip-flop stages 51 are received by the multivibrator 52. The circuits 50 and 51 include a total of seven tandem connected flip-flop stages which will count a total of 128 ($2^7$) pulses. On the 128th pulse, the last flip-flop stage triggers the monostable multivibrator 52 which triggers the duodecade glow tube 54. This tube includes an anode 85, which is connected to a B+ plate supply through a plate resistor 86, and twelve cathodes. Each time a pulse is received from the multivibrator 52, the glow discharge between the anode and one of the cathodes jumps to the succeeding cathode. The cathodes are connected to each other and to an output conductor 88 in such a manner that the operation of the tube may be changed to accommodate different receiver spans. For example, assuming that the span between the receivers $R_1$ and $R_2$ is one foot and that a switch 87 is at the $R_2$ position, the cathodes 2–4, 6–8 and 10–12 are connected to ground and the cathodes 1, 5 and 9 are connected to the output conductor 88. Whenever the glow discharge is from one of the cathodes 1, 5 or 9, current will flow along three paths, through a resistor 89 to the cathode and through the tube, through a resistor 90, a capacitor 91 and through the tube, and through the coil 92 of the galvanometer 55, two resistors 93 and 94, a diode 95, the capacitor 91 and through the tube. Current flows through the galvanometer coil 92 for a very brief time, however, because the capacitor 91 rapidly becomes charged. It is apparent, therefore, that the galvanometer 55 will be deflected at every fourth cathode or at every 512th ($2^7 \times 4$) pulse from the oscillator 49 when the switch 87 is at the $R_2$ position.

Assuming that the span between the receivers $R_1$ and $R_3$ is three feet and that the switch 87 is at the $R_3$ position, the cathodes 2–12 are connected to ground and only the cathode 1 is connected to the output conductor 88. In this case the galvanometer 55 is deflected at every 1536th ($2^7 \times 12$) pulse from the oscillator 49.

The output pulses from the tube 54, in addition to deflecting the galvanometer, also triggers the monostable multivibrator 63 which triggers the decade glow tube 53. This tube has an anode 96, a plate resistor 97 and ten cathodes, nine of which are grounded. When the discharge is from cathode 1, the current again flows along three paths, through a resistor 98 and the tube, through a resistor 99, a capacitor 100 and the tube, and through the galvanometer coil 92, the resistor 93, a diode 101, the capacitor 100 and the tube. Again the current flow through the coil 92 is very brief because the capacitor 100 rapidly becomes charged up. It is apparent that for every tenth pulse from the duodecade tube 54, the decade tube 53 will deflect the galvanometer 55 once. The galvanometer record will show a series of pulses every tenth one of which is a strong one because the deflections due to the conduction through the two tubes 53 and 54 are added together.

Using the dimensions previously assumed and also assuming that the transmitter T is pulsed 5.4 times per foot of travel in the bore, an oscillator 49 frequency of 94.82 kc. will produce a relatively weak galvanometer deflection each travel time interval of one millisecond, and a relatively strong deflection each travel time interval of 10 milliseconds. This is true regardless of which of the receivers $R_2$ or $R_3$ is being used with the receiver $R_1$ to measure travel time because, by setting switch 87 to the proper position, the distance between the receivers and the wave travel time between them is related to the number of pulses from the oscillator 49 necessary to produce an output pulse from the tube 54 and from the tube 53.

It is apparent that parameters other than those described could be employed. If the spacing between the receivers is changed, for example, the oscillator frequency can be adjusted so that the travel time can be determined conveniently. Of course other parameters, such as the number of flip-flop circuits or the manner of connecting the cathodes of the glow tubes, could also be changed to accomplish similar results.

The output X from the span control circuit 61, FIGURE 3, is connected to the input X to the duodecade tube 54 and insures that setting of the switch 87 corresponds to the setting of the switch in the span control circuit that determines which receiver is to be employed.

The output pulse from the multivibrator 42, FIGURE 3, also places the gate control multivibrator 37 and the anti-noise gate 38 in an "off" condition until the next master pulse begins a new cycle. A conductor 64 connects the output of the multivibrator 16 to the "off" side of the multivibrator 42 and insures that the measuring circuits are off at the beginning of each new cycle.

The system includes three test and calibrating circuits. When the winch that lowers the logging apparatus into the bore is not running, the switch 14, FIGURE 3, in the panel may be turned to the test position so that a test oscillator 56, which may be a simple multivibrator, will trigger the monostable multivibrator 15 for test purposes.

Figure 6:
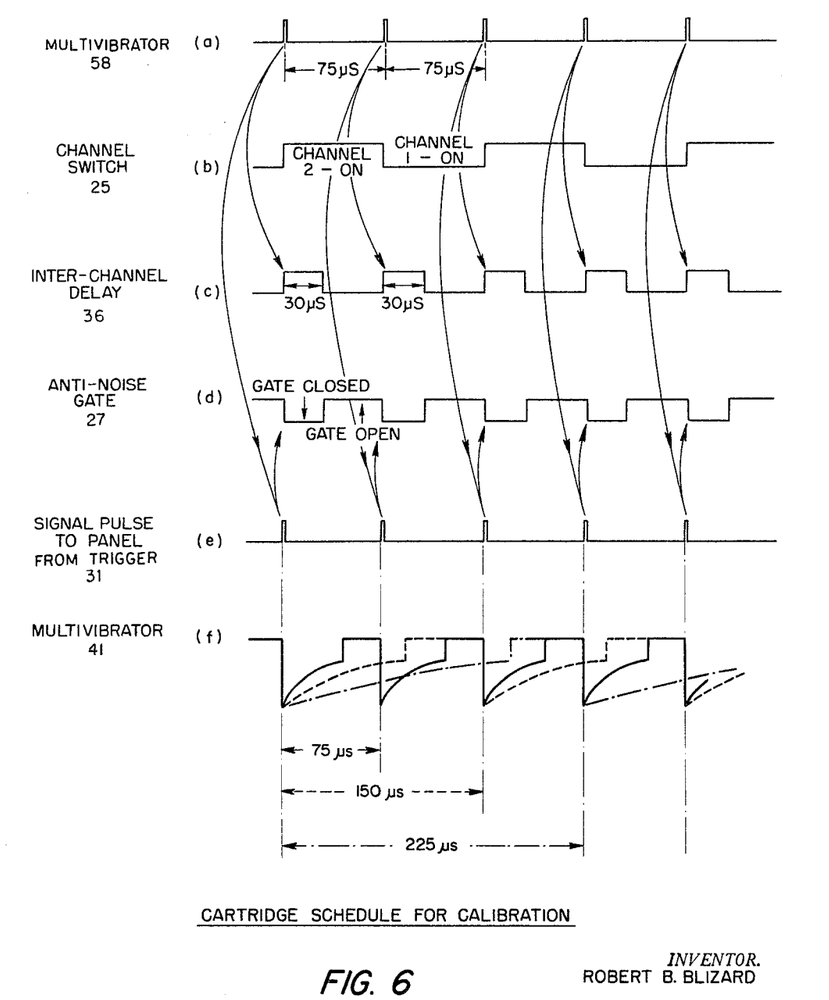
FIGURE 6 shows a series of graphs illustrating operational conditions of various circuit elements used in calibrating the bore equipment.

A calibration oscillator 57 is provided in the cartridge. Ordinarily, the calibration oscillator 57 is made inoperative by rectifying the master pulses by means of a rectifier 28 to produce a voltage that biases the oscillator 57 beyond cutoff so that no calibration pulses are fed into the preamplifiers. By opening the switch 18' the master pulses are stopped and the bias on the oscillator tube leaks off so that the oscillator 57 starts up and triggers a monostable multivibrator 58 which injects pulses into the preamplifiers of receivers $R_1$ and $R_2$ just as though signals were being received by the two receivers thereby checking the operation of most of the cartridge components. The output from multivibrator 58 is also connected to the multivibrator 36 which opens the anti-noise gate 27 just as a master pulse would. The channel switch 25 is operated by the pulse from the trigger 31. The calibration oscillator 57 is crystal controlled to produce a train of signal pulses spaced 75 microseconds apart which are sent to the panel over the conductor 33. The monostable multivibrator 15 is triggered either from the test oscillator 56 or the bistable multivibrator 13 (if the winch is running), providing the pulses required to operate the gates and the time to amplitude converter in the panel. To make the panel circuit responsive to integer multiples of 75 microseconds, the recovery time of the multivibrator 41 in the panel is adjusted by turning a potentiometer 59. These calibration operations are illustrated by the graph shown in FIGURE 6 and the monostable multivibrator circuit 41 is illustrated in greater detail in FIGURE 10.

Figure 10:
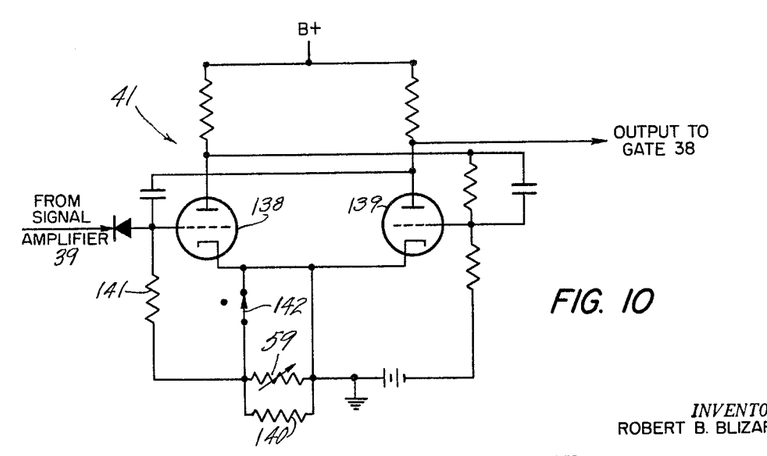
FIGURE 10 is a circuit diagram of a monostable multivibrator shown in block form in FIGURE 3.

The multivibrator 41, FIGURE 10, is a monostable plate coupled multivibrator, the general operation of which is well known. A triggering pulse is received from the amplifier 39 (or from the third flip-flop stage if the switch 40 is in the calibration position) by the grid of a tube 138 and the output is taken off of the plate of a tube 139. The resistors 59 and 140 are very much larger than a series connected resistor 141 so that, when a switch 142 is in an open position, the time duration beween output pulses may be adjusted by the potentiometer 59. If the multivibrator is to be triggered by every incoming pulse, the potentiometer 59 is set so that the circuit returns to its normal state before the arrival of the pulse next after the triggering pulse, as is illustrated by the solid line waveform (f), FIGURE 6. If the circuit is to be triggered by alternate pulses, the potentiometer is set so that the circuit is still in the timing state when the next pulse arrives and is insensitive to it, as is illustrated by the dashed line wave form. The dash-dot line illustrates the condition where the circuit is triggered by every third pulse. The length of time between pulses could, of course, be extended to a substantially longer period if desired. This potentiometer arrangement has distinct advantages over conventional systems which employ a switch to selectively connect different resistors into the circuit. One advantage is that convention circuits require precise and stable circuit elements while the circuit shown in FIGURE 10 does not.

The oscillator 49 in the panel may also be used for calibration purposes. Thus, by turning the switch 40 to the calibration position and holding the travel time gate 48 open by switching a potential source 34 into the circuit by means of switch 34a, a stream of pulses is taken from the third flip-flop stage in the counter and is received by the surface equipment just as if it had been received fro mthe cartridge 10.

By employing the various calibrating circuits described, the operation of the components making up the system may be checked and the system may be calibrated under varying conditions. For example, the components in the panel may be calibrated independently of the components in the cartridge and the entire system may be calibrated whether or not the supporting cable is moving.

The variable gain amplifier 30 (FIGURE 2) in the cartridge 10 is manually controlled from the panel by a bias control 60 to adjust the signal strength. When the signal strength is low but is still large when compared to the noise, a high gain is used, and when the bore is noisy, the gain is reduced. A CK5784 dual control pentode may be used for this purpose.

The channel switch 25, a portion of which is illustrated schematically in FIGURE 7, may comprise two halves, each consisting of three silicon diodes 70, 71 and 72 in a T arrangement, i.e., two diodes in the series arms and a third in the shunt arm. All three are oriented to conduct current away from their common junction; current is supplied to this junction through a resistor 73 and a power supply B+ terminal. The shunt diode 72 terminates on a plate of a tube in the multivibrator 22 and, when this plate is highly positive, the shunt diode is cut off and the series diodes 70 and 71 conduct and permit the signal to go through. When the plate goes relatively negative, the shunt diode conducts and the series diodes are cut off and prevent the signal from passing. Two circuits, similar to the one illustrated are connected between the pre-amplifiers 29 and 35 and the amplifier 30.

Figure 12:
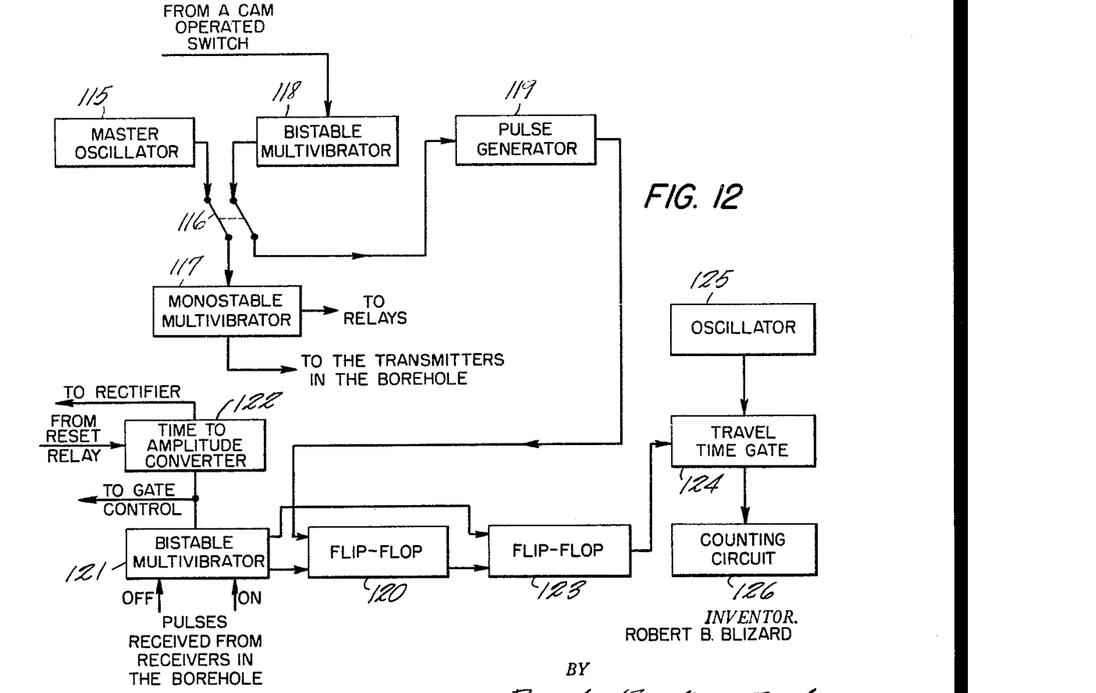
FIGURE 12 is a block diagram illustrating schematically a portion of an acoustic well logging apparatus constructed in accordance with another embodiment of this invention.

In FIGURE 12 is illustrated an alternative system wherein the transmitter is pulsed independently of the integrating system in the panel and an integration of a series of travel time measurements made on a per foot of apparatus travel basis is still provided. This differs from the previously described system wherein the transmitter is triggered in synchronism with the operation of the integrating system. The cartridge components shown in FIGURE 2 and 14 and most of the components shown in FIGURE 3 may be used with this alternative system. Only that portion of the system that differs from the system illustrated in FIGURE 3 is shown in FIGURE 12.

A master oscillator circuit 115 provides pulses at a constant rate, for example 10 pulses per second, and is connected through a double pole switch 116 to a monostable multivibrator relay drive 117. This relay drive may be similar to the relay drive 15, FIGURE 3, and the components connected to it may be similar to those shown in FIGURES 2 and 3. A bistable multivibrator 118 is connected through the switch 116 to a pulse generator circuit 119 and pulses the generator circuit at equal depth intervals in the bore. This may be accomplished by a cam operated switch, for example, as explained previously. Each pulse from the generator 119 turns on a flip-flop circuit 120 (see waveform (c), FIGURE 13). A bistable multivibrator 121, which receives pulses from the receivers in the bore as previously described, is also connected to the flip-flop circuit 120. When the multivibrator circuit 121 is turned on by a pulse from the first receiver in the bore, the leading edge of the multivibrator pulse turns off the flip-flop circuit 120. When the flip-flop circuit 120 is turned off, it turns on the flip-flop circuit 123 and when the multivibrator 121 is turned off by the pulse from the second receiver in the bore, it turns off the flip-flop circuit 123. Since the output of the flip-flop circuit 123 is connected to a travel time gate 124, the gate is turned on for a length of time equal to the time interval $\Delta t$ between the arrival of the pulses from the receivers and allows pulses to pass from an oscillator 125 to a counting circuit 126.

The components shown in FIGURE 12 may be employed in place of certain components shown in FIGURE 3. For example, the multivibrators 117, 118 and 121 may be substituted for the multivibrators 15, 13 and 42, respectively, the oscillators 115 and 125 for the oscillators 56 and 49, respectively, and the circuits 122, 124 and 126 for the circuits 43, 48 and the total travel time counting circuit, respectively.

Figure 13:
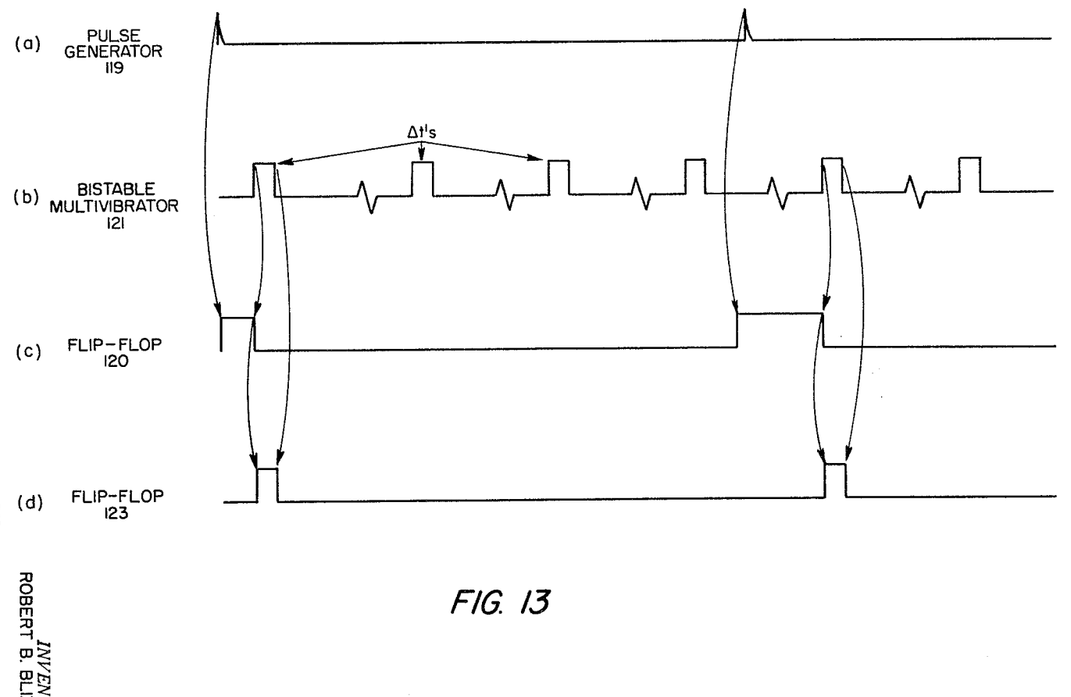
FIGURE 13 is a graph illustrating the sequence of events in the operation of the embodiment of the invention illustrated in FIGURE 12.

The operation of this system is best illustrated by reference to the graph of FIGURE 13. Since the oscillator 115 triggers the transmitter much more often than the multivibrator 118 triggers the pulse generator 119, the multivibrator 121 is turned on many more times than the pulse generator 119 is triggered, as can be seen by a comparison of the waveforms (a) and (b). The flip-flop circuit 120 will be turned on by each of the relatively infrequent pulses from the generator 119 and will remain on until the arrival of the next succeeding pulse from the multivibrator 121. When the flip-flop circuit 120 is turned off, the flip-flop 123 is turned on as can be seen from waveforms (b), (c) and (d). The flip-flop 123 is turned off shortly thereafter by the arrival of the pulse from the second receiver which turns off the multivibrator 121. The flip-flop 123, therefore, is turned on only during the time interval between the arrival of the pulses from the two receivers. It can be seen that the system illustrated in FIGURE 12 will still provide an integration of the total acoustic wave travel time even though the transmitter is not pulsed according to the distance travelled by the apparatus in the bore. This is accomplished by the pulse generator 119 which is controlled by the movement of the apparatus in the bore and which selects one pulse at each depth interval in the bore.

The proper frequency for the oscillator 125 should be related to the rate at which pulses are generated by the generator 119 in the manner discussed with regard to the system illustrated in FIGURES 2 and 3.

Figure 14:
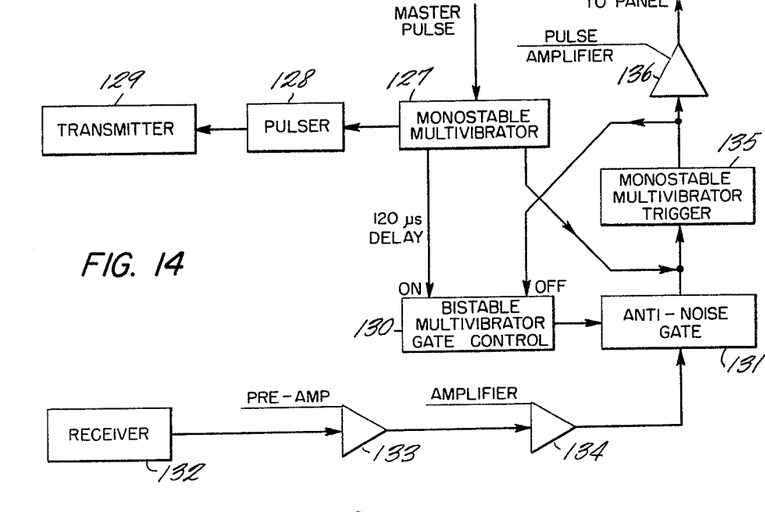
FIGURE 14 is a block diagram illustrating schematically a portion of an acoustic well logging apparatus constructed in accordance with another embodiment of this invention.
Figure 15:
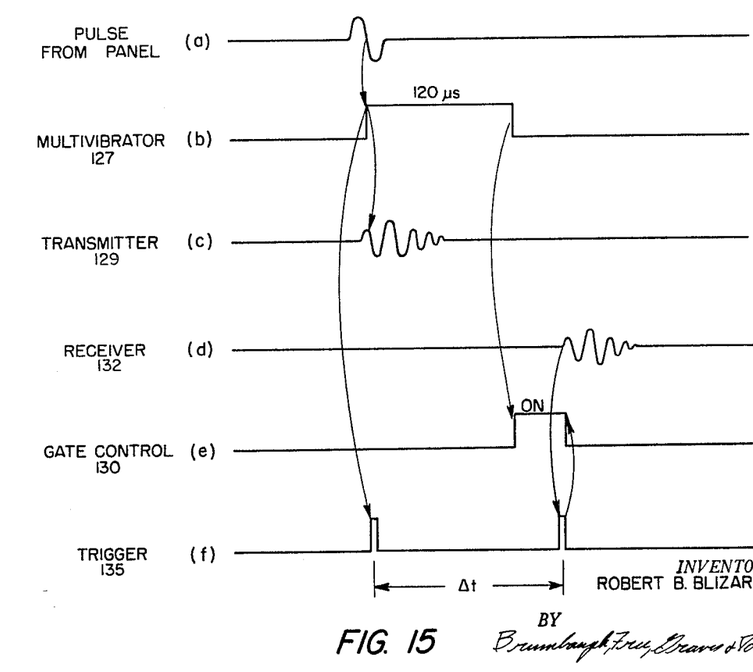
FIGURE 15 is a graph illustrating the sequence of events in the operation of the embodiment of the invention illustrated in FIGURE 14.

In FIGURE 14 is illustrated a single receiver system which may be employed in place of the double or triple receiver systems previously described. FIGURE 15 illustrates a graph of the waveforms for the system of FIGURE 14. Only the downhole components of the logging apparatus are illustrated; the panel components may be identical to either the system illustrated in FIGURES 2 and 3 or the system illustrated in FIGURE 12.

With reference to FIGURE 14, a master pulse is received from the panel by a monostable multivibrator 127 which triggers a pulser 128 and an acoustic wave transmitter 129. After a 120 microsecond delay the down coming portion of the pulse generated by the multivibrator 127 turns on a bistable multivibrator gate control circuit 130. This control circuit turns on an anti-noise gate 131 just prior to the earliest expected time of arrival at a receiver 132 of the acoustic wave from the transmitter 129. The electrical pulse generated by the receiver is amplified by a preamplifier 133 and an amplifier 134, passes through the open anti-noise gate 131 and triggers a monostable multivibrator trigger 135. The pulse from the multivibrator 135 turns off the gate control circuit 130 and is also amplified by a pulse amplifier 136 prior to transmission to the panel. When the master pulse was received by the multivibrator 127, it also triggered the multivibrator 135 and sent a pulse to the panel.

With reference to FIGURE 15, the time interval between the pulses generated by the trigger 135 due to the master pulse and the arrival of the acoustic wave at the the receiver 132 is equal to the time interval $\Delta t$. The gate control circuit 130 is turned on just prior to the earliest expected time of arrival of the pulse at the receiver 132 and is turned off immediately after the arrival of the pulse so that the danger of the system being triggered by a stray noise signal is virtually eliminated.

It can be seen, therefore, that a novel and useful well logging apparatus has been provided. The apparatus provides an indication of the short interval velocity of acoustic waves in the earth formations and of the total travel time of the waves with considerably improved accuracy and reliability over what has been hitherto obtainable. This improved accuracy is due in part to the fact that wave velocity indications are sent up the cable to the panel in the form of sharp pulses rather than voltage amplitudes; sharp pulses are relatively undistorted by the cable as compared to voltage amplitudes.

Another novel feature of the system is the fact that it includes means for obtaining a travel time measurement at predetermined intervals of apparatus travel in the bore rather than at fixed time intervals as in conventional systems. The predetermined intervals could have a fixed value or they could be irregularly varied according to a predetermined sequence of values, just as long as the system obtains measurements as a function of apparatus travel in the bore.

Still another novel feature of the invention is the integrating system employed for the total acoustic wave travel time measurement. This integrating system is much more accurate than conventional systems because it measures the total travel time directly from the receiver pulses rather than from a time to amplitude converter as is usually the case. Because of this novel arrangement, inaccuracies in the converter are not imparted to the total travel time measurement. The invention has a further advantage in that the total travel time measurement is related directly to the distance traveled by the apparatus through the bore. A further advantage of the logging system is the fact that it can be manually operated if desired. If an occasion arises when a special log is desired over a certain section of a bore, the switch 14, FIGURE 3, could be periodically opened and closed on the conductor leading to the multivibrator 13. The pulses representing the wave travel time could be used to produce a log using the recorder 12, or the signals could be taken from the galvanometers 47 and 55 and plotted on graphs in any manner desired.

While particular embodiments of the present invention have been shown and described for purposes of illustration, it is apparent that changes and modifications may be made without departing from this invention in its broader aspects. Therefore, the invention described herein is not to be construed as limited to the specific embodiments described but is intended to encompass all modifications thereof coming within the scope of the following claims.

I claim:

1. Well logging apparatus for determining the travel time of acoustic wave energy through the earth formations traversed by a bore comprising a logging tool adapted to travel through the bore, said tool including longitudinally spaced acoustic means for periodically generating and receiving acoustic wave energy, means in said tool responsive to acoustic wave energy for deriving pairs of electrical signals in which signals of each pair are spaced a time duration apart representative of the time required for acoustic wave energy to travel through the earth formations between at least two of said acoustic means at a predetermined spacing, integrating means coupled to said signal deriving means for obtaining indications of the total travel time of acoustic wave energy along intervals of the bore, said integrating means including means for periodically generating pulses in a predetermined manner and means for counting said pulses, said integrating means being responsive to said pairs of electrical signals in such a manner that said counting means counts said pulses during the time duration between the signals of each of said pairs, means coupled to said acoustic means for changing said predetermined spacing, and means coupled to said counter means for varying the counting rate of said counter means as said predetermined spacing is changed.

2. Well logging apparatus for determining the travel time of acoustic wave energy through media traversed by a bore comprising a logging tool adapted to travel through the bore, said tool including longitudinally spaced acoustic means for periodically generating and receiving acoustic wave energy, means in said tool coupled to at least two acoustic means for deriving pairs of electrical signals in which signals of each pair are spaced a time duration apart equal to the time required for acoustic wave energy to travel between said two acoustic means, means to conduct said signals to the surface of the earth, means at the surface of the earth coupled to said conducting means and responsive to said pairs of electrical signals for measuring the travel time of acoustic wave energy between said two acoustic means, said measuring means including means for converting said time durations between said signals into proportional amplitude voltage signals, capacitor means coupled to said converting means for storing said voltage signals, indicator means having a voltage holding circuit, means for selectively connecting said storage capacitor means to said indicator means, means for selectively discharging said storage capaictor means, and means for selectively charging said capacitor means to a reference value prior to application to said capacitor means of a signal from said converting means.

3. Well logging apparatus for determining the travel time of acoustic wave energy through media traversed by a bore comprising a logging tool adapted to travel through the bore, said tool including longitudinally spaced means for periodically generating acoustic wave energy and receiver means responsive to said acoustic wave energy for developing pairs of electrical signals, electrical pulse generating means coupled to said generating means for periodically actuating said acoustic wave generating means, means in said tool coupled to said receiver means for deriving pairs of electral pulse signals in which signals from each pair are spaced a time duration apart representative of the time required for acoustic wave energy to travel between said receiver means and including signal generating means responsive to said electrical signals for deriving corresponding pairs of short duration electrical pulse signals, and calibrating means including oscillator means, means coupled to said electrical pulse generating means and responsive to the pulse output thereof for maintaining said oscillator means normally inoperative during operation of said electrical pulse generating means and rendering said oscillator means operative when the output of said pulse generating means to said oscillator means is discontinued, and means operative in response to the output of said oscillator means to supply spaced calibration signals to said signal generating means.

4. Well logging apparatus for determining the travel time of acoustic waves through media traversed by a bore comprising travel time measuring means and integrating means individually responsive to pairs of electrical signals in which signals of each pair are spaced a time duration apart representative of the time required for acoustic wave energy to travel between predetermined points, said travel time measuring means including converter means for converting the time duration between the individual signals of each of said pairs into a voltage signal and indicator means responsive to said voltage signal, said integrating means including oscillator means and counter means, said integrating means being responsive to said pairs of electrical signals to total a series of time durations between said signals of each pair, means to derive calibrating pulses from said oscillator means, and means to selectively couple calibrating pulses to said travel time means in lieu of said pairs of electrical signals to calibrate the same.

5. Well logging apparatus for measuring characteristics of media in a well bore comprising, means for developing pairs of short duration electrical pulses indicative of the travel times of acoustic waves through a predetermined distance at different levels in said well bore, pulse generating means responsive to each of said pairs of pulses to generate an output pulse having a duration equal to the spacing between the pulses of said pairs, means coupled to said pulse generator means to produce an output signal having an amplitude proportional to the duration of the pulse generator output pulse, means responsive to said output signal to provide an indication of the amplitude thereof, gate means coupled to said pulse generator, a source of periodic electric signals coupled to said gate means, said gate means passing said periodic signals during application thereto of said pulse generator output pulse, and counter means coupled to said gate means for indicating the total number of periodic signals passing therethrough.

6. Well logging apparatus for measuring characteristics of media in a well bore comprising, means for developing pairs of short duration electrical pulses indicative of the travel times of acoustic waves through a predetermined distance at different levels in said well bore, cable means for conducting said pulses to the surface of the earth, pulse generator means at the surface of the earth coupled to said cable means and responsive to each of said pairs of pulses to generate an output pulse having a duration equal to the spacing between the pulses of said pair, means coupled to said pulse generator means to produce an output signal having an amplitude proportional to the duration of the pulse generator output pulse, means responsive to said output signal to provide an indication of the amplitude thereof, gate means coupled to said pulse generator, a source of periodic electrical signals coupled to said gate means, said gate means passing said periodic signals during application thereto of said pulse generator output pulse, and counter means coupled to said gate means for indicating the total number of periodic signals passing therethrough.

7. Well logging apparatus for determining the characteristics of acoustic wave energy in a well bore comprising, a support adapted to be moved through said bore, acoustic wave generating means and a plurality of acoustic wave receiving means mounted in said support in spaced apart relationship, means actuating said wave generating means to produce recurring bursts of acoustic waves at a rate proportional to the rate of movement of said support through said bore, means coupled to each of said receiving means to produce an electrical pulse of short duration in response to each burst of acoustic energy received thereat, means to apply the pulses produced by said receiving means to a single channel, each successive pairs of pulses corresponding to the pair of acoustic signals received by two of said receivers in response to a generator burst of acoustic energy, first measuring means coupled to said channel and responsive to each of said pairs of pulses to provide a pulse having an amplitude proportional to the time spacing of said pulses of said pair, means responsive to said proportional amplitude pulses to provide indications of the amplitudes thereof, a source of periodic electrical signals having a period smaller than the time duration between the pulses of said pair, gate means coupled to said channel and said source of periodic signals and responsive to said pair of pulses for passing said periodic signals for said time duration, and counter means coupled to said gate means for indicating the total number of periodic signals passing therethrough.

8. A well logging arrangement for measuring both short interval velocity and total travel time of acoustic waves in a well bore comprising, a support adapted to be moved through said bore, acoustic wave generating means and a plurality of acoustic wave receiving means mounted in said support in spaced apart relationship, means for selecting different ones of said receiving means to define different short intervals, signal generating means responsive to actuation of said wave generating means and said selected receiving means for developing electrical signals indicative of the travel times of acoustic waves through said selected short interval at different levels in said formations, gate means coupled to said signal generating means, a source of periodic signals coupled to said gate means, said gate means passing said periodic signals during application thereto of said electrical signals, means for counting the periodic signals passing through said gate means, and means for varying the counting rate of said counting means in accordance with the particular short interval selected by said selecting means.

References Cited by the Examiner
UNITED STATES PATENTS

| | | | |
|---|---|---|---|
| Re. 24,446 | 3/1958 | Summers | 181—0.5 |
| 2,651,027 | 9/1953 | Vogel | 340—18 |
| 2,708,485 | 5/1955 | Vogel | 181—0.5 |
| 2,931,455 | 4/1960 | Loofbourrow | 181—0.5 |
| 2,938,592 | 5/1960 | Charske et al. | 181—0.5 |
| 2,949,973 | 8/1960 | Broding et al. | 181—0.5 |
| 3,018,839 | 1/1962 | Isaacson | 181—0.5 |
| 3,022,488 | 2/1962 | Stripling | 181—0.5 |
| 3,050,150 | 8/1962 | Tixier | 181—0.5 |

BENJAMIN A. BORCHELT, *Primary Examiner.*

JOHN C. MACNAB, C. W. ROBINSON, CHESTER L. JUSTUS, SAMUEL FINEBERG, *Examiners.*

M. J. MARNOCK, A. S. ALPERT, M. F. HUBLER, J. W. MILLS, *Assistant Examiners.*